United States Patent [19]
Steenhoudt

[11] 3,801,396
[45] Apr. 2, 1974

[54] METHOD OF MAKING A COMPOSITE PANEL

[75] Inventor: Jan Steenhoudt, Dworp, Belgium

[73] Assignee: N. V. Bekaert, S.A., Zwevegem, Belgium

[22] Filed: Sept. 15, 1969

[21] Appl. No.: 857,871

[30] Foreign Application Priority Data
Sept. 17, 1968 France ............................ 68.166430

[52] U.S. Cl.................. 156/62.2, 19/145, 156/62.4, 161/79
[51] Int. Cl............................................... B29j 5/00
[58] Field of Search ............. 19/145; 156/62.2, 374, 156/62.4; 161/79

[56] References Cited
UNITED STATES PATENTS

| 2,396,256 | 3/1946 | Field ..................................... 161/79 |
| 3,276,928 | 10/1966 | Pearson et al. ..................... 156/62.4 |
| R24,804 | 3/1960 | Shorts ............................. 156/374 X |
| 2,943,010 | 6/1960 | Stefl et al. ......................... 19/145 X |
| 3,118,750 | 1/1964 | Dunlap et al. ..................... 19/145 X |

Primary Examiner—Leland A. Sebastian

[57] ABSTRACT

A composite panel consisting of a network or mesh body having applied thereto a covering or wrapping formed of cut pieces of fibrous material which have been spread or scattered upon the network and the material compressed upon the network such that pieces of the fibrous material lie over and under the network and between meshes.

4 Claims, 5 Drawing Figures

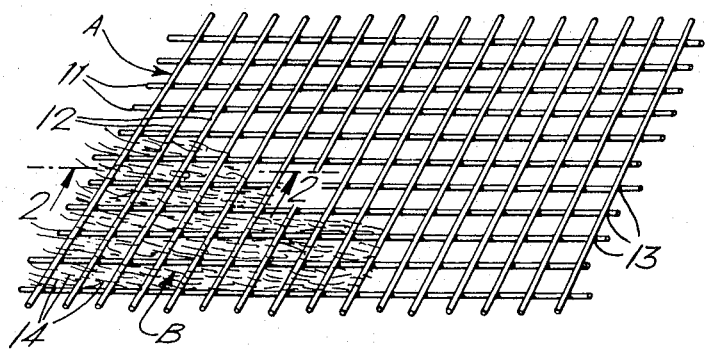
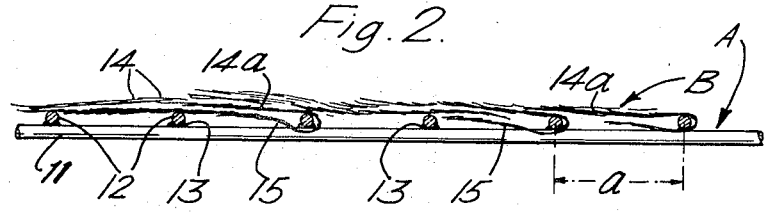
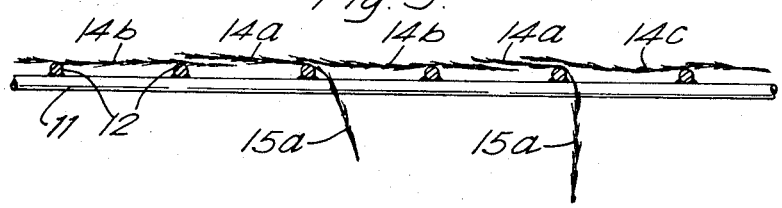
INVENTOR
JAN STEENHOUDT
BY
SPARROW AND SPARROW
ATTORNEY

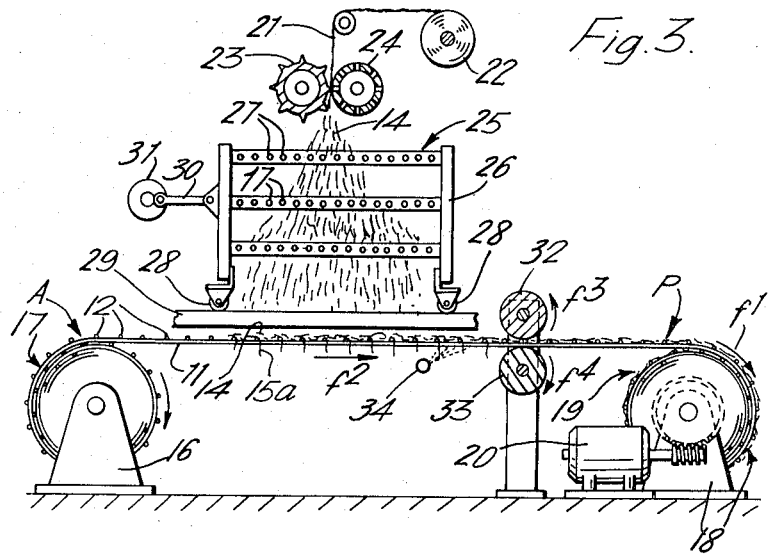
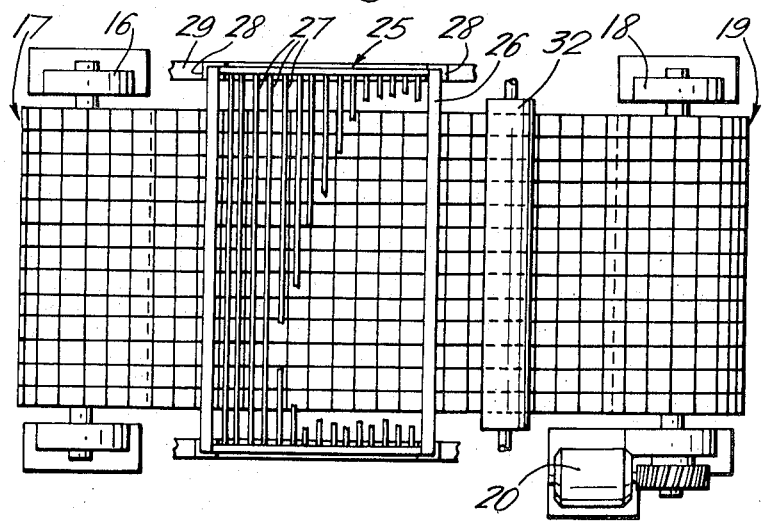

METHOD OF MAKING A COMPOSITE PANEL

BACKGROUND OF THE INVENTION

The invention relates to a composite panel which has a fibrous wrapping, enveloping a reinforcement consisting of a network or mesh to which the wrapping is firmly locked.

Panels are known which are made of crosslaid metal threads upon which are laid cords or tapes of fiberglass or similar material. The metal threads are welded at their intersections together with the tapes. Where the cords or tapes cannot be readily welded to the metal threads, the former are perforated to permit the welding of the wire threads therethrough. Regarding the use of the panels made in this manner for support and reinforcement of plastics, they have the disadvantage of having a structure with fibers which are directionally oriented, and/or have exposed metal surfaces which are not covered by fibers, so that they do not offer any adhesiveness to the plastics with which the panels are to be covered. Furthermore, the various processes of manufacturing of these panels are relatively slow. These disadvantages are overcome by this invention.

SUMMARY

The invention consists in such novel features, construction arrangements, combination of parts and improvements as may be shown and described in connection with the apparatus herein disclosed by way of example only and as illustrative of a preferred embodiment. The gist of the invention resides in the production and provision of a novel composite panel for reinforcing structures made of plastics, which can be easily bent and formed for various applications and to which the plastics firmly adhere.

The composite panel consists of a network or mesh reinforcement and a felted or felt-like wrapping made of short fibers. The wrapping is applied to one side of the reinforcement by spreading or distribution of the fibers thereon, and to which some of the fibers adhere by folding around the mesh of the reinforcement, whereas the loose ends of the fibers rolled onto the other side of the reinforcement, are maintained in the wrapping by the felting.

Objects and advantages will be set forth in part hereafter and in part will be obvious herefrom or may be learned by practicing the invention, the same being realized and attained by means of the instrumentalities and combinations pointed out in the appended claims.

A specific object of the invention is to provide as a new article of manufacture a composite panel consisting of a network or mesh reinforcement made of strong wires, preferably welded, and of a more or less felted wrapping of glass fibers or the like material.

It is a further object of the invention to provide a wrapping for the wire reinforcement part of the panel at least on one side thereof, portions of the wrapping enveloping the wire mesh, the wrapping thus advantageously permitting an excellent adhesion of coatings of plastics which may be applied to both sides of the composite panel.

Another object of the invention is to provide an inner core which may be permanently formed into various shapes for composite walls having layers of plastics applied thereto and formed thereon by compression.

Yet another object of the invention is the provision of a new method of manufacturing reinforcing panels by spreading or scattering short length fibers on a trellis or like network of suitable material such as wires, thereon, whereby the fibers partly lie on top of the wires, partly hang through and under the meshes of the network, and then compressing the thus disposed fibers, forming a felt-like cover or wrapping upon the network or mesh.

Furthermore, it is an object of the invention to provide a machine for producing the panels of this invention.

Various further and more specific purposes, features and advantages will clearly appear from the detailed description given below taken in connection with the accompanying drawings which form part of this specification and illustrate merely by way of example embodiments of the article and of the device of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the figures of the drawing, in which:

FIG. 1 is an isometric view of a portion of the panel according to the invention;

FIG. 2 is a partial section of the panel along the line 2—2 in FIG. 1, shown in an enlarged scale;

FIG. 3 is a schematic side elevation of the panel making machine;

FIG. 4 is a plan view of the machine shown in FIG. 3; and

FIG. 5 is a schematic illustration of the formation of the panel.

DESCRIPTION OF THE PREFERRED EMBODIMENTS

Referring now in more detail to the drawings illustrating preferred embodiments by which the invention may be realized, there is shown in FIG. 1 a portion of a composite panel basically comprising a reinforcing member A consisting of a trellis or similar network of elongated members and of a wrapping B consisting of felt or felt-like fibrous material. Reinforcing member A consists preferably but not exclusively of two layers of said members, that is, of a "warp" 11 and a "weft" 12 which are laid preferably at right angles to each other, although any other suitable angle could be used. Warp members 11 and weft members 12 are welded or otherwise secured together at their points of crossing 13. Members 11 and 12 consist preferably of metal, but may also consist of plastic or fibrous material which is of sufficient strength and stiffness for the intended purpose.

Wrapping B is formed of relatively short length fibers 14 which are applied in an irregular or scattered manner and are more or less entangled forming a more or less loose felt-like material or felting. These fibers may consist of various materials, such as, for example, glass, synthetic plastic, such as polyvinyl-chloride, superpolyamide; textiles such as cotton, hemp, jute, rayon and even metal. The length of these fibers is not critical but they may be advantageously of the order of twice the dimension "a" of the meshes of the support member, that is, approximately 5 centimeters. However, the term "short length" used herein and in the claims is to be construed as meaining any suitable length for the intended purpose. The thickness of the wrapping may be variable, for example, in the order between one and several millimeters. The wrapping adheres to support A because certain fibers, for example fibers 14a, are slung around elongated members 12 of reinforcement A, whereas the ends 15 of fibers 14 which had gone below the meshwork are more or less involved and maintained in wrapping B on account of the loose felting. Finally adherence to wrapping B may be improved by spraying a fine mist of glue or like adhesive substance against the lower surface and/or the upper surface of the wrapping.

The thus formed composite panel may be easily brought into suitable shapes by permanently deforming reinforcement A. It can be used as the core of shaped walls, in the construction of shells, fuselages, car bodies, etc. The fibrous wrapping offers an excellent means for adhesion to various cover layers.

FIGS. 3 and 4 show schematically a machine for producing the composite panels. It comprises a roll stand or other suitable support means 16 on which an unwinding roll 17 of prefabricated reinforcement A is mounted, and a rewinding roll stand or other suitable support means 18, for a roll 19 of panel material P. Roll 19 is wound in the direction of the arrow $f_1$ by a gear motor 20. Reinforcement A and completed panel material P proceed in a continuous movement in the direction of the arrow $f_2$.

Above the horizontally spread reinforcement A is a device for cutting fibers from continuous rolls of thread and for spreading the former irregularly or scatteringly on the reinforcement. Threads or fibers such as those indicated by the reference numeral 21 are unwound from a spool 22. Each one of threads 21 passes through two rotary cutting cylinders 23,24 which cut threads 21 into fibrous shreds or fragments 4, which drop onto a device 25 for spreading, extending and distributing the same in an irregular fashion. Device 25 consists of a frame 26 carrying several layers of rods 27 which distribute fibers 14, because frame 26 supported on wheels 28 which roll on rails 29 is moved reciprocatingly by a drive mechanism consisting, for example, of a connecting rod 30 and an eccentric 31. Fibers 14 thus drop at random on reinforcement A, from whence fibers 14 drop astraddle two successive elongated members or wires 12 as shown at 14b in FIG. 5, or three successive elongated members or wires 14 as shown at 4c, and also in overlapping relation. Fibers 14 rest there in balance and receive subsequently further fibers on top of them. When they drop only on one elongated member or wire 14 and on the ends of other such members or wires, as is the case with respect to fibers 14a, they hang down temporarily, as shown at 15a (FIGS. 3, 5).

The assembled reinforcement A with the fiber wrapping B passes thereafter between at least two compression rollers 32, 33 which rotate in the direction of the arrows $f_3, f_4$ (FIG. 3). They roll, as shown at 15 in FIG. 2, the downward hanging ends 15a (FIG. 5) of fibers 14a against the lower face of the layer of fibers in which they become more or less entangled because of the loose felting performed by rollers 32, 33.

As the case may be, it is possible to spray an adhesive against the lower face and/or the upper face of the fibrous layer by one or by several spray pipes 34 (FIG. 3) located rearwardly of the compression rollers 32, 33.

Eventually, finished composite panel P which is flexible, is wound on winding roll 19.

While the invention has been described and illustrated with respect to a certain preferred example which gives satisfactory results, it will be understood by those skilled in the art after understanding the principle of the invention, that various other changes and modifications may be made without departing from the spirit and scope of the invention.

What is claimed is:

1. Process of producing a composite panel comprising the steps of forming a network of elongated metallic members; welding said members at the intersections thereof, forming a wrapping around said members of said network by randomly spreading short length fibers thereon while said network moves in one direction, trailing said fibers thereon, compressing said fibers on said network and forming a loose felt thereon.

2. Process of producing a composite panel, according to claim 1, including the step of cutting fibers into said short lengths from rolls of long length fibers prior to spreading of said short length fibers on said network.

3. Process of producing a composite panel, according to claim 2, further including passing said short length fibers through openings in a reciprocating distributing device prior to their being spread on said network.

4. Process of producing a composite panel, according to claim 2, and applying an adhesive on said short length fibers prior to compressing the same on said network.

* * * * *